United States Patent [19]

Esper et al.

[11] Patent Number: 4,503,348
[45] Date of Patent: Mar. 5, 1985

[54] MAGNETIC TRANSDUCER

[75] Inventors: Friedrich J. Esper, Leonberg; Gottfried Meudt, Asperg, both of Fed. Rep. of Germany

[73] Assignee: Robert Bosch GmbH, Stuttgart, Fed. Rep. of Germany

[21] Appl. No.: 97,843

[22] Filed: Nov. 27, 1979

[30] Foreign Application Priority Data

Nov. 28, 1978 [DE] Fed. Rep. of Germany ....... 2851365

[51] Int. Cl.³ ............................................. H02K 21/38
[52] U.S. Cl. ..................................... 310/155; 310/168
[58] Field of Search ......................... 310/168, 155, 152

[56] References Cited

U.S. PATENT DOCUMENTS

| 3,431,444 | 3/1969 | Wilson | 310/168 |
| 3,866,193 | 2/1975 | Wiegand | 365/133 |
| 3,983,430 | 9/1976 | Howard | 310/168 X |
| 4,150,314 | 4/1979 | Zabler et al. | 310/155 |
| 4,217,512 | 8/1980 | Hauler et al. | 310/155 |
| 4,247,601 | 1/1981 | Wiegand | 365/133 X |

Primary Examiner—Donovan F. Duggan
Attorney, Agent, or Firm—Frishauf, Holtz, Goodman & Woodward

[57] ABSTRACT

An electromagnetic transducer which generates signals on the basis of the Barkhausen effect under periodically alternating externally applied magnetic switching fields. Prior to use, the magnetic sensor element, for example a ferromagnetic wire, is pre-magnetized by undergoing a program which subjects the wire to a coercive applied field substantially higher than the alternating interrogation field. The coercive field places different zones of the wire into magnetic saturation with varying relative polarity, thereby creating two or more zones of different magnetization. When subjected to the alternating, low intensity interrogation field, sensor coils detect a high level, bipolar output signal.

2 Claims, 14 Drawing Figures

MAGNETIC TRANSDUCER

FIELD OF THE INVENTION

The invention relates to magnetic inductive transducers for generating electrical signals upon the passage of moving objects or markers on moving and rotating objects. In particular, transducers of the aforementioned type are used for generating the primary control signal for electronic injection systems of motor vehicles.

BACKGROUND OF THE INVENTION AND PRIOR ART

Known magnetic transducers of the type to which the invention relates, and which are used, e.g. for generating fuel injection control pulses include as principal element a wire which is subjected to a prior and rather difficult mechanical treatment. The prior mechanical treatment insures that subsequent changes of magnetization of the wire takes place on the basis of relatively large shifts due to the Barkhausen effect. The rapidity of the change of the magnetic polarization is independent of the time behavior of the magnetic field, i.e., the quantity dH/dt.

It has been found in practice that the output pulses generated by the known transducer have an amplitude which is insufficient for the use in motor vehicles and in other cases where spurious signals are the rule and which are thus subject to erroneous control signals. Accordingly, it is necessary to provide a transducer in which the output signals reach at least a minimum amplitude. In an article published in the magazine "Automotive Engineering" in the issue of February 1978, on pages 44–48, there is described an asymmetric system in which the magnetic element generates a first pulse of large amplitude and an opposite pulse of very small amplitude when subjected to a change in magnetization. However, electronic control systems often require transducers with the capability of generating a bipolar signal of relatively high amplitude which is not provided by the aforementioned systems.

THE INVENTION

It is thus a principal object of the present invention to provide a magnetic transducer which is capable of generating bipolar output signals of high amplitude. This object is attained according to the invention by providing a magnetic transducer having a ferromagnetic wire as principal sensor element and by providing that the sensor wire is premagnetized to institute at least two zones of opposite magnetic polarity. The transducer according to the invention becomes usable even in applications which are subject to relatively frequent and intensive spurious signals, for example in motor vehicles. In a favorable feature of the invention, the sensor wire is disposed between two different magnetic systems so disposed that magnetic poles of opposite algebraic sign face one another and that the sensor wire is disposed therebetween. Magnetic shields are then installed for alternately shielding the sensor wire and one or the other of the magnetic systems.

In a variant of the invention, at least the ferromagnetic sensor wire and one of the magnetic systems may be of annular construction. In still another variant of the invention, the magnetic shields may be rotating hollow cylinders with suitable windows for permitting the passage of the magnetic field, the cylinders being coaxial with the long axis of the sensor wire. Suitably, the magnetic systems may be composed of permanent magnets although electromagnets are also possible.

Still other features and advantages of the invention will emerge from the following detailed description of a number of preferred exemplary embodiments as well as from the claims, all of which relate to the figures of the drawing.

THE DRAWING

DESCRIPTION OF THE PREFERRED EMBODIMENTS

Figure 2:
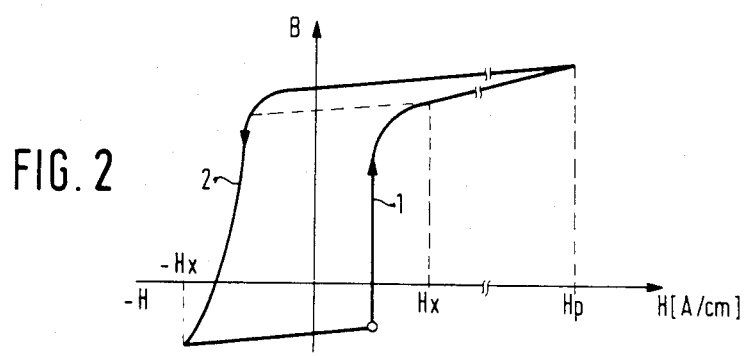
FIG. 2 is a magnetization diagram illustrating the magnetization curve for the sensor wire of the invention.

The magnetic transducer according to the present invention is based on the use of a ferromagnetic sensor element, for example a wire of a given composition and subjected to special mechanical treatment. By subjecting such a wire to, for example a positive external magnetic field of strength $H_p \geq 300$ A/cm, (programming field) the sensor wire is driven practically to magnetic saturation as shown in FIG. 2. Subsequently, the application of an alternating magnetic field of much reduced strength, i.e., for example $H_x = \pm 50$ A/cm the wire generates electrical signals of two kinds. When the applied field $H_x$ is negative, a small signal associated with a relatively small or slow Barkhausen jump 2 is generated, whereas, when the alternating magnetic field $H_2$ shifts to positive values, there occurs a relatively abrupt and large Barkhausen shift 1. These electrical pulses can be sensed and carried away by suitably constructed sensor coils adjacent to or surrounding the sensor wire. In the example illustrated in FIG. 2, the initial polarization is shown to be carried to saturation in the positive direction of the applied magnetic field, but the same process could be performed with a magnetic field of negative intensity. By applying the polarizing process to the wire with the aid of suitably constructed magnetizing systems or by suitable displacement in a single magnetizing system, the overall extent of the wire can be made to exhibit separate active magnetic zones of different polarity. By subsequently disposing the sensor wire in the active region of suitably constructed magnetic systems, a number of signals of high intensity but different polarity can be generated simultaneously or in some desired time sequence.

Figure 1:
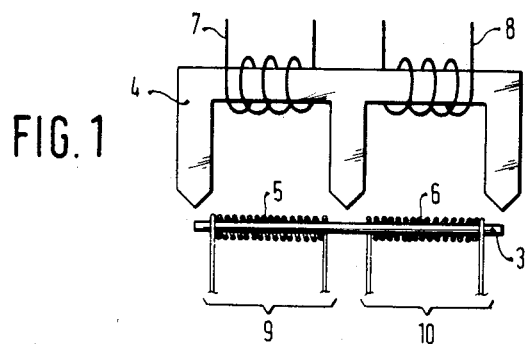
FIG. 1 is a schematic illustration of a sensor wire, associated sensor coils and a magnetizing system in a first embodiment of the invention.
Figure 3:
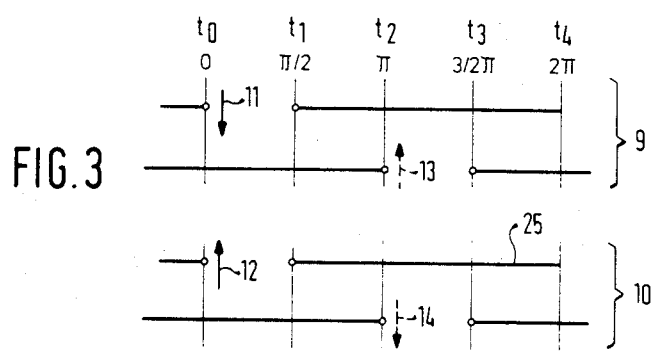
FIG. 3 is a diagram illustrating the temporal occurrence of output pulses from the sensor wire of the invention.

A first embodiment of a magnetic transducer according to the invention is shown in FIG. 1 and is seen to include a ferromagnetic sensor wire 3 disposed adjacent to a magnetic system 4 and carrying two sensor coils 5, 6. The magnet 4 has two magnetizing coils 7, 8 which are so wound and energized that they generate within the wire 3 two zones 9, 10 of opposite magnetic polarity. Accordingly, when the field is alternated in the manner described with respect to FIG. 2, the sensor wire generates in the sensor coils 5, 6 respective signals 11, 12 of opposite polarity. During the further reversal of magnetization, the sensor coils experience the relatively low-amplitude signals 13, 14, shown by the broken arrows 13, 14 in FIG. 3. These latter signals are clearly detectable but have no practical significance within the present invention. The diagram of FIG. 3 is a timing diagram illustrating the relative time of occurrence of the signals but does not illustrate their relative amplitude. The solid lines 25 in FIG. 3 serve to illustrate the presence of magnetic shield and apertures therein and will be described in further detail below. The amplitude of the large signals may be, for example, greater than 1,000 mV while the amplitude of the secondary electrical signals 13, 14 may be less than 100 mV.

Figure 4:
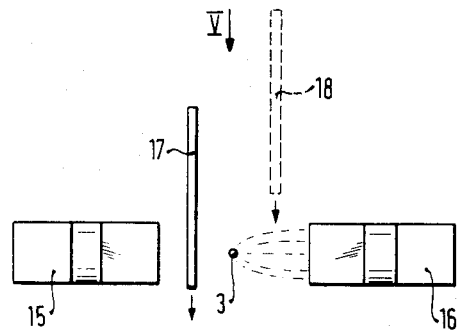
FIG. 4 is a schematic illustration of a head-on view of a sensor wire according to the invention with associated magnets and shields.
Figure 5:
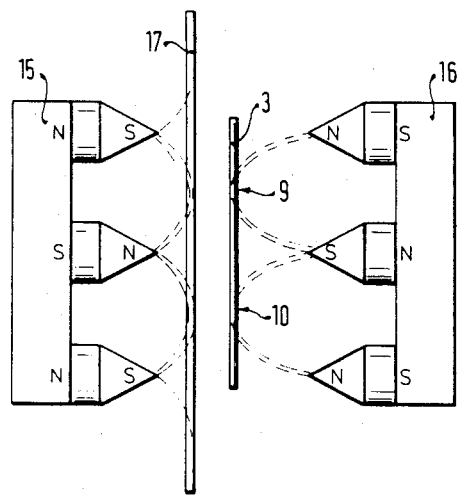
FIG. 5 is a top view of the system illustrated in FIG. 4.

A second embodiment of the transducer according to the invention is shown in FIGS. 4 and 5. The transducer includes two double-acting permanent magnet systems 15, 16 of opposite magnetic polarity. The sensor wire 3 is placed between the two magnetic systems. Also included are two shutters 17, 18 which may be placed alternately between the wire 3 and the associated magnetic system 15 or 16 and serve to shield the wire from the magnetic field of that system. As before, two sensor coils would be disposed on the wire 3 but are not shown in FIGS. 4 and 5 for the sake of simplicity. Prior to use, the wire is subjected to magnetic field intensities of approximately $H_p \geq 300$ A/cm as a programming magnetization to saturate the wire in a given direction in a first zone of the wire and in the opposite direction in the other zone of the wire. This is done for example by closing the shutter 18 and placing the wire 3 and its coils very close to the magnetic system 15 so as to provide the saturation field strength. Subsequently, the wire 3 is moved back into the approximate center between the two magnetic systems 15 and 16. When the shutter 18 is removed and the shutter 17 is moved into place, the effect of the magnetic system 15 is shielded and only the magnetic system 16 acts on the wire to reverse the magnetic intensity. The dimensions and distances of the components of the magnetic systems 15, 16 are such that when the wire is centered and only one of the systems is shielded, the effective field strength does not exceed 50 A/cm. After the shutter 18 is inserted and the shutter 17 is removed, the two wire zones return to their originally programmed magnetization. During this desired shift of magnetic polarization there occurs in the sensor coils mounted on the wire 3 a useful electrical signal of a voltage of approximately 1,000 mV or greater. By alternately opening the two shutters, the desired bipolar signal may be generated as many times as necessary.

Figure 6:
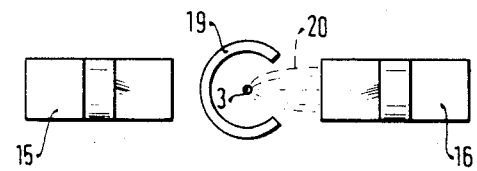
FIG. 6 is a head-on illustration of a transducer according to the invention in a variant embodiment with a cyclindrical shield.
Figure 7:
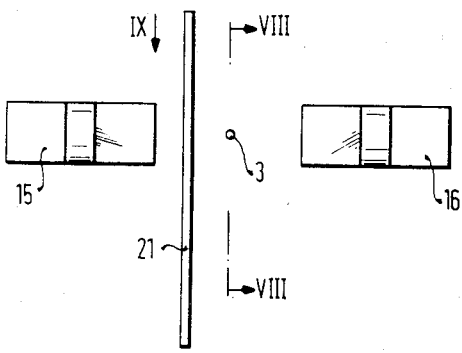
FIG. 7 is a head-on view of a transducer with rotating disc shields.
Figure 8:
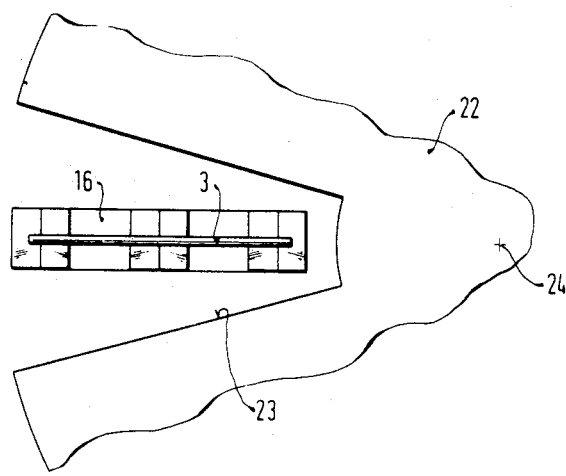
FIG. 8 is a side view of the apparatus of FIG. 7.
Figure 9:
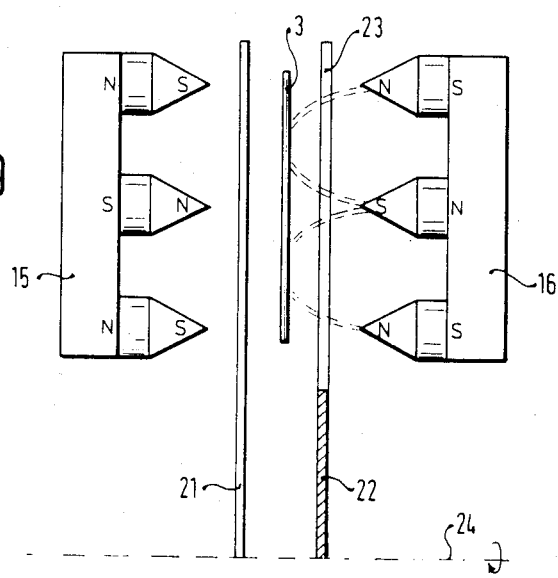
FIG. 9 is a top view of the apparatus of FIG. 7.

In a third embodiment of the invention shown in FIG. 6, the shutters 17 and 18 are constructed as a rotating hollow cylinder 19 coaxial with the wire 3 and having a window 20 over substantially its entire length. The rotation of the hollow cylinder 19 causes the alternate application of the magnetic fields of the systems 15 and 16 and the desired periodically changing magnetization. A similar embodiment of the transducer is illustrated in FIGS. 7, 8 and 9. In these embodiments, the alternating shielding of the wire from one or the other of the magnetic fields is performed by two circular shutters 21, 22 and each having a window 23. The window 23 of the shutter 22 is shown to be angularly displaced with respect to the window in the shutter 21 so that only one of the two magnetic systems can interact with the wire 3. The axis of rotation 24 of the circular shutters 21, 22 is seen to be normal with respect to the long axis of the wire.

The occurrence of signals from the embodiments of FIGS. 4–9 is the same or similar as that illustrated in FIG. 3.

Figure 10:
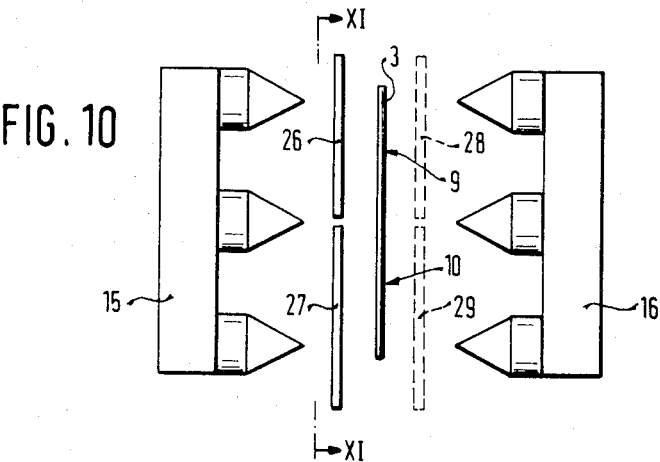
FIG. 10 is a top view of a transducer according to the invention using sliding displaced plane shields.
Figure 11:
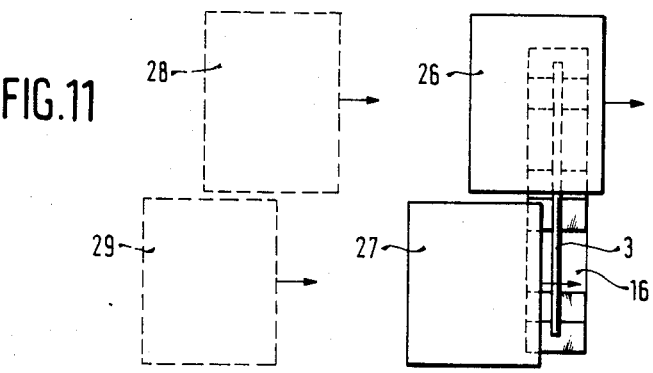
FIG. 11 is a partial side view of the system of FIG. 10.
Figure 12:
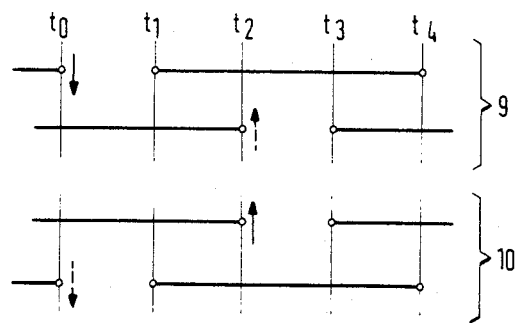
FIG. 12 is a timing diagram showing the occurrence of output pulses from the systems of FIGS. 4–11.

In a still further embodiment of the invention, illustrated in FIGS. 10 and 11, the magnetic shutters are two-part shutters 26, 27; 28, 29. The two-part shutter 26, 27 is shown to be so constructed that the shield 26 moves into place before the shield 27 so that the first signal is generated by the wire zone 9, and the subsequent signal by the wire zone 10 (FIG. 12). In this manner, the signals from the two halves of the wire may be generated at different times separated by a selectable time interval. The same time displacement of the signals may be obtained by the embodiment of FIG. 6 by appropriate angular displacement of the window 20 of the cylinder 19 for the different two wire zones 9, 10. Similarly, the embodiment of FIGS. 7–9 can be constructed to generate output signals at different times by angular displacement of the opening 23 of the circular shutters 21, 22 so that the two wire zones 9, 10 are shielded at different times. Furthermore, if the signals from the two wire zones 9, 10 are not needed at the same time, a single sensor coil may be used to generate the desired bipolar signals.

Figure 13:
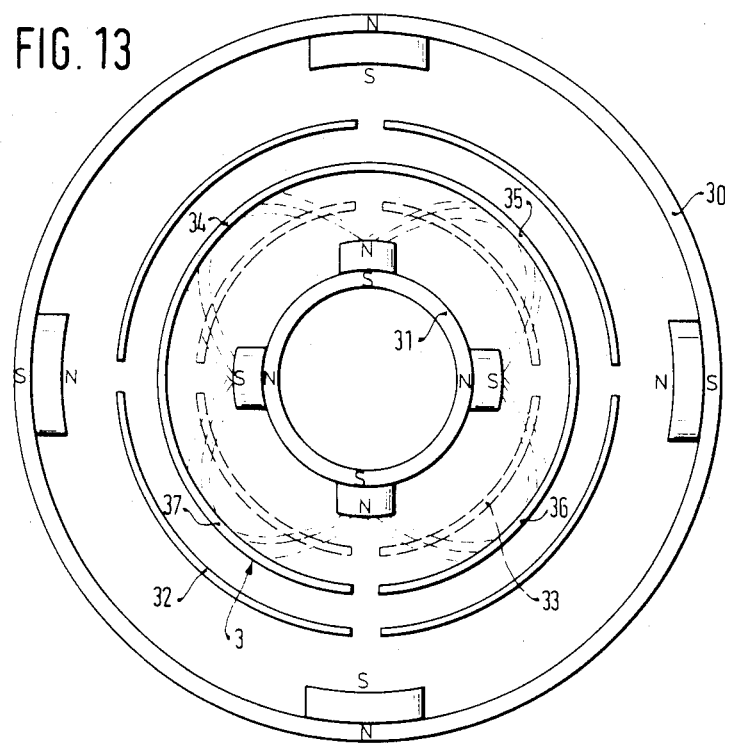
FIG. 13 is an end view of a further embodiment of the invention with annular sensor wire cylindrical shields and coaxial magnetic systems.

Yet another embodiment of the invention is illustrated in FIG. 13 in which all constituent elements are cylindrical and coaxial. The sensor wire 3 is a hollow cylinder as are the adjacent cylindrical shutters 32, 33. However, in this case, the wire 3 is subdivided into four magnetic zones 34, 35, 36, 37 indicated schematically by dashed lines to suggest the magnetic fields due to the inner magnetic system 31. Accordingly, the sensor wire 3 carries four sensor coils (not shown). The shutter 32 shields the wire 3 from the effects of the magnetic field of the outer magnetic system 30 while the shutter 33 shields the wire 3 from the field due to the inner magnetic system 31. The selective admission of magnetic fields to the wire takes place by moving the shutters 32, 33 in the direction of their cylindrical axis. The transducer illustrated in FIG. 13 generates two bipolar signals. If these signals are desired to occur at different times, the shutters 32, 33 may be subdivided into partial shutters moved at different times.

Figure 14:
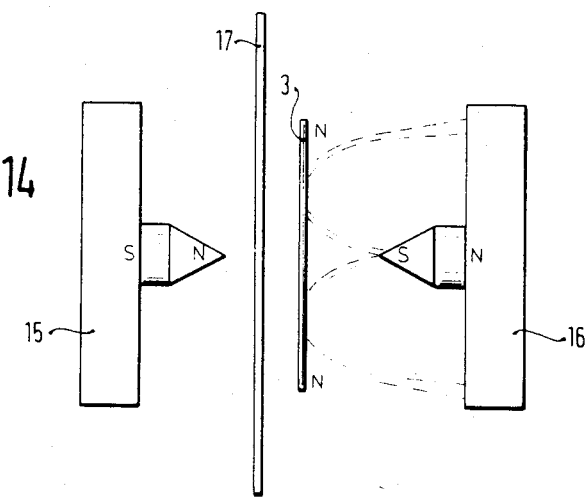
FIG. 14 is an illustration of a simplified magnetic system for use with the embodiment of FIG. 4.

FIG. 14 illustrates a simplified magnetic system 15 for use with any one of the embodiments in FIGS. 4–11. Such a magnetic system may suffice to generate bipolar signals of approximately $\geq 600$ mV under otherwise similar conditions.

If it is desired to generate unipolar electrical signals rather than bipolar signals it is necessary merely to employ sensor coils of relative opposite handedness instead of sensor coils with the same handedness. This change may be made in any one of the embodiments of the invention.

If it is desired to, for example, double the number of signals in a given embodiment, it is necessary only to double the number of windows of the shutter 19 in FIG. 6 and of the shutters 21, 22 in FIGS. 7-9.

By suitably combining two or more of the embodiments illustrated in the foregoing description, it is possible to induce and generate a different number of signals from the separate zones of the wire. For example, it is possible to generate a recognition signal which occurs only once for every 360° of rotation around a particular wire zone while the other wire zone is used to generate a plurality of control signals. If the transducer is used to generate unipolar signals, the recognition signal may occur at a frequency different from the control signals.

All of the transducers described above are made ready for use by an initial programming of the wire in a relatively high magnetic field followed by periodic alternation of a symmetric, relatively low-level magnetic field.

The initial programming may be regularly repeated by suitable choice of the magnets and/or disposition of the wire 3 in a location which is not in the exact center of the two magnetic systems 15, 16 and 30, 31. In such a construction, it is possible, in every cycle of signal generation, to initially apply the high-intensity programming field $H_p$ followed by the alternating magnetizing field $H_x$. Such a disposition results in an asymmetric magnetization of the wire with a particularly effective immunity to spurious signals and external magnetic fields.

External magnetic fields may also be attenuated by suitable encapsulation of the transducer in a soft iron case.

In the exemplary embodiments described above, the various zones of the wire were assumed to have been of equal length. However, the amplitude of the electrical output signal depends further more on the length of the magnetized volume of wire so that, by changing the relative length of the zones within the wire, it is possible to generate, for example, a recognition signal of relatively reduced amplitude with respect to the control signals of high amplitude.

The amplitude of the output signal also depends on other parameters, for example the diameter of conductor loops and the number of turns in the windings of the sensor coil. These parameters are generally adjusted for maximum or optimum amplitude.

The foregoing description relates to merely preferred exemplary embodiments of the invention which are subject to the combination of the features of any one embodiment with those of any other as well as to changes within the competence of a person skilled in the art without departing from the scope of the invention.

As used in this application, the term "A/cm" is Abvolt/cm, the unit in the International System of Units (SI) for magnetic field strength. One Abvolt=$10^{-8}$ Volt. One Oersted=79.58 A/m=0.7958 A/cm.

We claim:

1. A transducer, for production of electrical signals (11,12; 13,14), having magnetic systems (4; 15,16; 30,31) for magnetization and re-magnetization of a Wiegand sensor wire (3), said wire (3) having a sensor coil (5,6) wound thereon, wherein said wire (3) has been originally magnetized in one direction by a strong magnetic field ($H_p$), and has a magnetization direction operationally controllable by means of a weak alternating magnetic field ($H_x$), said magnetic systems comprising a first magnetic system (15,30) and a second magnetic system (16,31) disposed on either side of said sensor wire (3) such that magnetic poles of opposing sign face one another, and further comprising shield means for alternate shielding of said sensor wire (3) from said first and second magnetic systems (15,16; 30,31) respectively.

2. A transducer according to claim 1, wherein (FIGS. 7,8,9) said shield means are two opposite, rotatable, circular shutters (21,22) disposed, respectively, between said first and second magnetic systems (15,16) and said sensor wire (3), and each of said shutters (21,22) having an aperture (23), said apertures in said shutters being angularly displaced relative to one another.

* * * * *